US009488121B2

(12) United States Patent
Zhu et al.

(10) Patent No.: US 9,488,121 B2
(45) Date of Patent: Nov. 8, 2016

(54) METHOD FOR ESTIMATING VOLUMETRIC EFFICIENCY IN POWERTRAIN

(71) Applicant: GM GLOBAL TECHNOLOGY OPERATIONS LLC, Detroit, MI (US)

(72) Inventors: Yongjie Zhu, Troy, MI (US); Jun-Mo Kang, Ann Arbor, MI (US); Chen-Fang Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 219 days.

(21) Appl. No.: 14/290,112

(22) Filed: May 29, 2014

(65) Prior Publication Data

US 2015/0345417 A1 Dec. 3, 2015

(51) Int. Cl.
*G01M 15/04* (2006.01)
*F02D 41/18* (2006.01)
*F02D 41/14* (2006.01)

(52) U.S. Cl.
CPC ............. *F02D 41/18* (2013.01); *F02D 41/144* (2013.01); *F02D 2200/0402* (2013.01); *F02D 2200/0406* (2013.01); *F02D 2200/0411* (2013.01)

(58) Field of Classification Search
CPC ............................................... F02D 2200/0411
USPC ................ 73/114.31, 114.32, 114.33, 114.37
See application file for complete search history.

(56) References Cited

U.S. PATENT DOCUMENTS

| | | | | | |
|---|---|---|---|---|---|
| 7,117,078 | B1 * | 10/2006 | Gangopadhyay | F02D 41/1454 | 123/672 |
| 7,267,117 | B2 * | 9/2007 | Tonetti | F02D 41/0072 | 123/568.11 |
| 2002/0014103 | A1 * | 2/2002 | Matsubara | F02D 41/144 | 73/1.06 |
| 2006/0020386 | A1 * | 1/2006 | Kang | F02D 13/0249 | 701/114 |
| 2009/0320577 | A1 * | 12/2009 | Vennettilli | F02D 41/0002 | 73/114.31 |
| 2011/0184632 | A1 * | 7/2011 | Kang | F02D 41/0007 | 701/109 |
| 2012/0247439 | A1 * | 10/2012 | Ramappan | F02B 1/12 | 123/568.11 |
| 2013/0024091 | A1 * | 1/2013 | Yun | F02D 41/0057 | 701/103 |
| 2013/0073179 | A1 * | 3/2013 | Song | F02D 41/0072 | 701/102 |
| 2013/0268176 | A1 * | 10/2013 | Song | F02M 35/10393 | 701/102 |
| 2015/0128909 | A1 * | 5/2015 | Guralp | F02D 41/1454 | 123/478 |

* cited by examiner

*Primary Examiner* — Eric S McCall
(74) *Attorney, Agent, or Firm* — Quinn Law Group

(57) ABSTRACT

A method for estimating the volumetric efficiency in an internal combustion engine in real time includes the following steps: (a) monitoring an oxygen percentage of gases in the intake manifold using an oxygen sensor coupled to an intake manifold; and (b) determining, via a control module, a volumetric efficiency of the internal combustion engine in real time based, at least in part, on the oxygen percentage of the gases in the intake manifold.

18 Claims, 1 Drawing Sheet

METHOD FOR ESTIMATING VOLUMETRIC EFFICIENCY IN POWERTRAIN

TECHNICAL FIELD

The present disclosure relates to a method for estimating a volumetric efficiency in an internal combustion engine in real time as well as a powertrain including a control module capable of estimating the volumetric efficiency in real time.

BACKGROUND

Some vehicles include a powertrain for propulsion. The powertrain may include an internal combustion engine for generating output torque. Specifically, the internal combustion engine combusts an air/fuel mixture in order to generate output torque.

SUMMARY

In a spark-ignition internal combustion engine, it is useful to determine the volumetric efficiency in real time in order to adjust the cylinder charge. In the present disclosure, the term "volumetric efficiency" means the ratio between the theoretical and actual air masses trapped in the cylinder, and the term "cylinder charge" means the amount of the gas (fresh air and/or exhaust gas) inside the intake manifold that will be supplied to the cylinders of the engine at a specific time. It is useful to adjust the cylinder charge according to the estimated volumetric efficiency in order to maximize fuel efficiency and minimize fuel emissions. To do so, the cylinder charge can be adjusted in order to maintain the stoichiometric air/fuel ratio in the internal combustion engine. The term "air/fuel ratio" means the mass ratio of air to fuel present in the internal combustion engine. When the internal combustion engine operates within the stoichiometric air/fuel ratio, the internal combustion engine is supplied with just enough air to completely burn the available fuel.

The present disclosure relates to a method for estimating the volumetric efficiency in an internal combustion engine in real time. The internal combustion engine defines at least one cylinder and is part of a powertrain. The powertrain includes an intake manifold in fluid communication with the internal combustion engine and an exhaust manifold in fluid communication with the internal combustion engine. The exhaust manifold is in selective fluid communication with the intake manifold. The method for estimating the volumetric efficiency in an internal combustion engine in real time includes the following steps: (a) monitoring an oxygen percentage of gases in the intake manifold using an oxygen sensor coupled to the intake manifold; and (b) determining, via a control module, a volumetric efficiency of the internal combustion engine in real time based, at least in part, on the oxygen percentage of the gases in the intake manifold.

The present disclosure also relates to a powertrain including a control module capable of executing the steps of the method described above.

The above features and advantages and other features and advantages of the present teachings are readily apparent from the following detailed description of the best modes for carrying out the teachings when taken in connection with the accompanying drawings.

DETAILED DESCRIPTION

Figure 1:
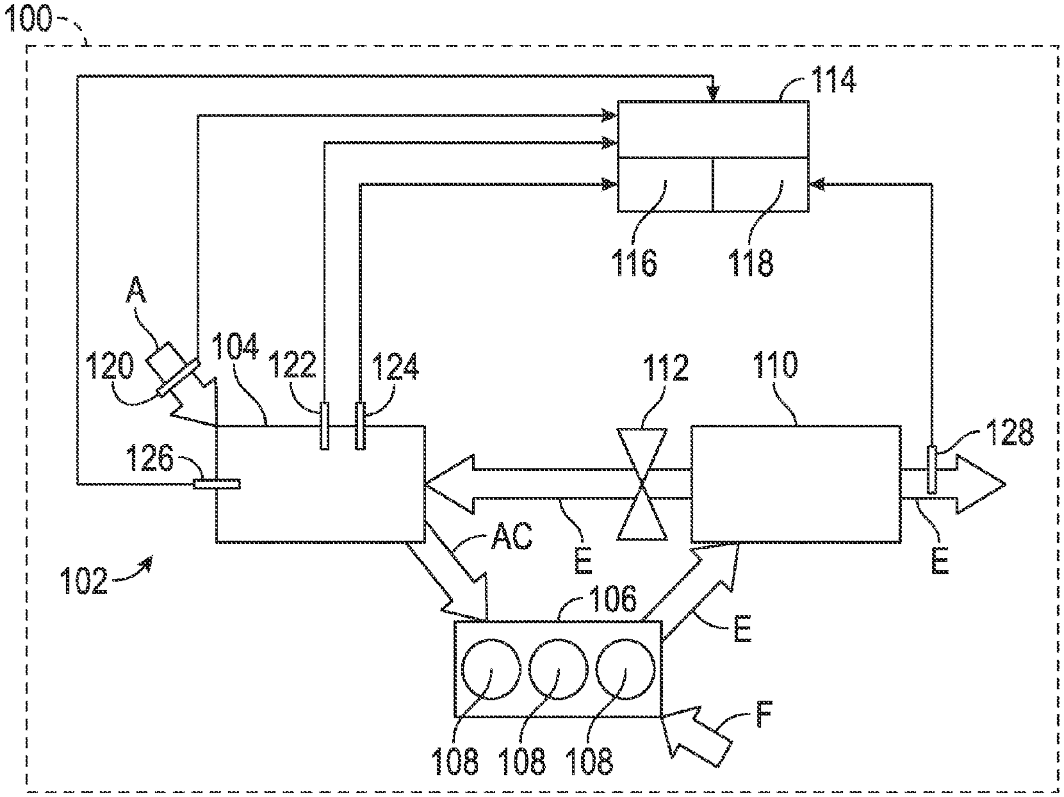
FIG. 1 is a block diagram of a powertrain including an internal combustion engine.

Referring to the drawings, wherein like reference numbers refer to like components, FIG. 1 schematically illustrates a vehicle 100 including a powertrain 102 for propulsion. The powertrain 102 includes an intake manifold 104 capable of receiving fresh air A from the atmosphere. The intake manifold 104 is in fluid communication with an internal combustion engine 106. Therefore, fresh air A can flow from the intake manifold 104 to the internal combustion engine 106. The internal combustion engine 106 is part of the powertrain 102 and defines at least one cylinder 108. In the depicted embodiment, the internal combustion engine 106 defines a plurality of cylinders 108. Each cylinder 108 can receive fuel F, such as gasoline, in order to combust an air/fuel mixture inside the cylinder 108. The combustion of the air/fuel mixture inside the cylinder 108 is then converted into torque in order to propel the vehicle 100.

The powertrain 102 additionally includes an exhaust manifold 110 in fluid communication with the internal combustion engine 106. Consequently, exhaust gases E stemming from the combustion in the cylinders 108 can flow from the internal combustion engine 106 to the exhaust manifold 110. At least a portion of the exhaust gases E can then exit the exhaust manifold 110, while another portion of the exhaust gases E can be recirculated to the intake manifold 104 in the process known as exhaust gas recirculation (EGR). To do so, the exhaust manifold 110 is in selective fluid communication with the intake manifold 104. An EGR valve 112 can control the amount of exhaust gases E that are recirculated to the intake manifold 104. The exhaust gas E is then mixed with the fresh air A inside to intake manifold 104 and then that mixture (i.e., the cylinder charge AC) can be supplied to the internal combustion engine 106. Thus, in the present disclosure, the term "cylinder charge" means the amount of the gas (fresh air A and/or exhaust gas E) inside the intake manifold 104 that will be supplied to the cylinders 108 at a specific time.

The powertrain 102 further includes a control module 114 in electronic communication with the internal combustion engine 106, the intake manifold 104, and the exhaust manifold 110. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. In the depicted embodiment, the control module 114 includes at least one processor 116 and at least one memory 118 (or any non-transitory, tangible computer readable storage medium). The memory 118 can store controller executable instruction sets, and the processor 116 can execute the controller executable instruction sets stored in the memory 118.

The control module 114 is in communication (e.g., electronic communication) with a manifold airflow (MAF) sensor 120, a manifold absolute pressure (MAP) sensor 122, a manifold air temperature (MAT) sensor 124, an oxygen sensor 126, and a wide-range air/fuel ratio sensor 128. The MAF sensor 120 is operatively coupled to the intake manifold 104 and can therefore measure and monitor the mass airflow (MAF) of fresh air A entering the intake manifold 104 (i.e., the mass airflow MAF). The control module 114 can receive an input signal from the MAF sensor 120 and determine the mass airflow MAF based on that input signal. The MAP sensor 122 is operatively coupled to the intake manifold 104 and can therefore measure and monitor the pressure of the gases inside the intake manifold 104 (i.e., the intake manifold pressure $P_m$). The control module 114 can receive an input signal from the MAP sensor 122 and then determine the intake manifold pressure $P_m$ based on that input signal. The oxygen sensor 126 may be zirconium dioxide, or zirconia, lambda sensor and is operatively coupled to the intake manifold 104 and can therefore measure and monitor the percentage of oxygen in the gases inside the intake manifold 104 (i.e., the oxygen percentage $O_2$). For example, the oxygen sensor 126 can measure and monitor the oxygen percentage of the gases inside the intake manifold 104 or the oxygen mass percentage of the gases inside the intake manifold 104. The control module 114 can receive an input signal from the oxygen sensor 126 and then determine the oxygen percentage $O_2$ based on that input signal. The MAT sensor 124 is operatively coupled to the intake manifold 104 and can therefore measure and monitor the temperature of the gases inside the intake manifold 104 (i.e., the intake manifold temperature T). The control module 114 can receive an input signal from the MAT sensor 124 and determine the intake manifold temperature T based on that input signal. The air/fuel ratio sensor 128 is operatively coupled to the exhaust manifold 110 and can therefore measure and monitor the air/fuel ratio of the exhaust gases E in the exhaust manifold 110 (i.e., the air/fuel ratio λ). The control module 114 can receive an input signal from the air/fuel ratio sensor 128 and determine the air/fuel ratio λ based on that input signal.

Figure 2:
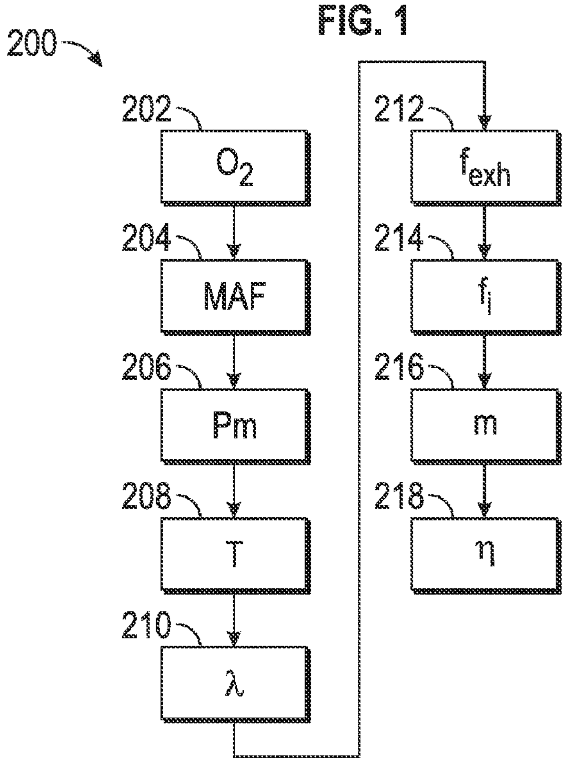
FIG. 2 is a flowchart of a method for estimating the volumetric efficiency of the internal combustion engine of FIG. 1 in real time.

With reference to FIG. 2, the control module 114 is specifically programmed to execute the instructions of a method 200 for estimating the volumetric efficiency of the internal combustion engine 106 in real time. The method 200 begins at step 202, which entails measuring and monitoring the percentage of oxygen in the gases inside the intake manifold 104 (i.e., the oxygen percentage $O_2$) using the oxygen sensor 126. In the present disclosure, the term "oxygen percentage" means the percent of oxygen in the intake manifold 104 in relation to the total gases inside the intake manifold 104. As non-limiting examples, the oxygen percentage $O_2$ may be expressed in terms of volume (i.e., oxygen volume percentage) or mass (oxygen mass percentage). The oxygen sensor 126 can generate an input signal indicative of the oxygen percentage $O_2$ and then send that input signal to the control module 114. The control module 114 is programmed and configured to receive the input signal from the oxygen sensor $O_2$ and determine the oxygen percentage $O_2$ based on that input signal. The method 200 then proceeds to step 204.

Step 204 entails measuring and monitoring the mass airflow of fresh air A entering the intake manifold 104 (i.e., the mass airflow MAF). MAF using the MAF sensor 120. As discussed above, the MAF sensor 120 can measure and monitor the MAF and then generate an input signal indicative of the MAF and then send that input signal to the control module 114. The control module 114 is configured and programmed to receive the input signal from the MAF sensor 120 and determine the MAF based on that input signal. The method 200 then continues to step 206.

Step 206 entails measuring and monitoring the pressure of the gases inside the intake manifold 104 (i.e., the intake manifold pressure $P_m$) using the MAP sensor 122. The MAP sensor 122 can generate an input signal indicative of the intake manifold pressure $P_m$ and then send that input signal to the control module 114. The control module 114 is configured and programmed to receive the input signal from the MAP sensor 122 and then determine the intake manifold pressure $P_m$ based on that input signal. The method 200 then continues to step 208.

Step 208 entails measuring and monitoring the temperature of the gases inside the intake manifold 104 (i.e., the intake manifold temperature T) using the MAT sensor 124. The MAT sensor 124 can generate an input signal indicative of the intake manifold temperature T and then send that input signal to the control module 114. The control module 114 is configured and programmed to receive the input signal from the MAT sensor 124 and determine the intake manifold temperature T based on that input signal.

Step 210 entails measuring and monitoring the air/fuel ratio of the exhaust gases E in the exhaust manifold 110 (i.e., the air/fuel ratio λ) using the air/fuel ratio sensor 128. The air/fuel ratio sensor 128 can generate an input signal indicative of the air/fuel ratio λ and then send that input signal to the control module 114. The control module 114 is configured and programmed to receive the input signal from the air/fuel ratio sensor 128 and determine the air/fuel ratio λ based on that input signal. Steps 202, 204, 206, 208 and 210 are not necessarily performed in a particular chronological order. Next, the method 200 continues to step 212.

Step 212 entails continuously determining, via the control module 114, an exhaust manifold burned gas fraction $f_{exh}$. In the present disclosure the term "exhaust manifold burned gas fraction" means the fraction of the total gases inside the exhaust manifold 110 that are burned gases due to the combustion process in the internal combustion engine 106. The combustion in the internal combustion engine 106 is not perfect and some unburned fuel, such as gasoline, and oxygen may remain after the combustion. The unburned fuel and oxygen can flow into the exhaust manifold 110. Accordingly, the gases in the exhaust manifold 110 include unburned gases and burned gases. The exhaust manifold burned gas fraction $f_{exh}$ is the mass fraction of burned gases relative to the mass of the total gases in the exhaust manifold 110.

$$f_{exh} = \frac{1+\lambda_s}{1+\lambda} \tag{1}$$

wherein:

$f_{exh}$ is the exhaust manifold burned gas fraction;

λ is the air/fuel ratio of the gases in the exhaust manifold 110; and $\lambda_s$ is the stoichiometric air/fuel ratio, which is known and is stored in the memory 118.

In step 212, the control module 114 is configured and programmed to calculate the exhaust manifold burned gas fraction $f_{exh}$ using Equation (1) in real time. Thus, the control module can calculate the exhaust manifold burned gas fraction $f_{exh}$ at predetermined time intervals, such as every 10 milliseconds. The exhaust manifold burned gas fraction $f_{exh}$ is based, at least in part, on the air/fuel ratio measured λ measure and monitored by the air/fuel ratio sensor 128. Then, the method proceeds to step 214.

Step 214 entails continuously determining, via the control module 114, the intake manifold burned gas fraction $f_i$. In the present disclosure, the term "intake manifold burned gas fraction" means fraction of the total gases inside the intake manifold 104 that are burned gases due to the combustion process in the internal combustion engine 106. As discussed above, at least some of the exhaust gases E are recirculated to the intake manifold 104, and a fraction of the exhaust gases E are burned gases, while the remaining fraction are unburned gases. The control module 114 is configured and programmed to calculate the intake manifold burned gas fraction $f_i$ using Equation (2):

$$f_i = 1 - \frac{\text{Intake } O_2(\%\text{ volume})}{100}(1 + 3.8) \tag{2}$$

wherein:

$f_i$ is intake manifold burned gas fraction; and

Intake $O_2$ is the volume percentage of oxygen monitored and measured by the oxygen sensor 126.

After determining the intake manifold burned gas fraction $f_i$, the method 200 proceeds to step 216. Step 216 entails determining, via the control module 114, the mass of the cylinder charge AC. As discussed above, the term "cylinder charge" means the amount of the gas (fresh air A and/or exhaust gas E) inside the intake manifold 104 that will be supplied to the cylinders 108 at a specific time. The control module 114 can determine the cylinder charge AC using Equation (3):

$$m = \frac{P_m V}{RT} \tag{3}$$

wherein:

m is the cylinder charge AC;

$P_m$ is the intake manifold pressure measured and monitored by the MAP sensor 122;

V is the intake manifold volume, which is a known value and is stored in the memory 118;

R is the ideal gas constant; and

T is the intake manifold temperature measured and monitored by the MAT sensor 124.

The cylinder charge AC is therefore based, at least in part, on the intake manifold pressure $P_m$ monitored and measured by the MAP sensor 122 and the intake manifold temperature T measured and monitored by the MAT sensor 124.

Next, the method 200 continues to step 218. Step 218 entails determining, via the control module 114, a volumetric efficiency η in real time. In the present disclosure, the term "volumetric efficiency" means the ratio between the theoretical and actual air masses trapped in the cylinder 108 and can be used to measure the efficiency of the engine. In step 218, the control module 114 can determine (or at least estimate) the volumetric efficiency η using Equation (4):

$$P_m(k) - P_m(k-1) - \frac{RT}{V}MAF(k-1)\Delta t - \frac{RT}{V}\frac{f_i(k) - f_i(k-1) + \frac{MAF(k-1)}{m(k-1)}f_i(k-1)\Delta t}{\frac{-f_i(k-1)}{m(k-1)} + \frac{f_{exh}(k-1)}{m(k-1)}} = -\left(P_m(k-1)\frac{V_{dis}}{V}\frac{RPM}{30}\Delta t\right)\eta(k-1) \tag{4}$$

wherein:

η is the volumetric efficiency of the internal combustion engine 106;

k−1 is a first moment in time in which measurements are taken with the MAF sensor 120, the MAP sensor 122, the MAT sensor 124, the oxygen sensor 126, and the wide-range air/fuel ratio sensor 128;

k is a second moment in time in which measurements are taken with the MAF sensor 120, the MAP sensor 122, the MAT sensor 124, the oxygen sensor 126, and the wide-range air/fuel ratio sensor 128;

MAF is the mass airflow measured and monitored by MAF sensor 120;

$P_m$ is the intake manifold pressure measured and monitored by the MAP sensor 122;

R is the ideal gas constant;

T is the intake manifold temperature measured and monitored by the MAT sensor 124.

V is the intake manifold volume, which is a known value and is stored in the memory 118;

Δt is the time difference between a first moment in time (k−1) and a second moment in time k when measurements are taken with the MAF sensor 120, the MAP sensor 122, the MAT sensor 124, the oxygen sensor 126, and the wide-range air/fuel ratio sensor 128;

$f_i$ is intake manifold burned gas fraction;

m is the cylinder charge AC;

$f_{exh}$ is the exhaust manifold burned gas fraction;

$V_{dis}$ is engine displacement, which is a known value and is stored in the memory 118; and RPM is engine speed.

Equation (4) is in standard form and the control module 114 can generate a graph in order to determine the volumetric efficiency η using Equation (4). Equation (4) is derived from the differential equations (5) and (6).

$$\begin{cases} \dot{f}_i = -\frac{MAF + W_{EGR}}{m}f_i + \frac{W_{EGR}}{m}f_{exh} & (5) \\ \dot{P}_m = \frac{RT}{V}MAF + \frac{RT}{V}W_{EGR} - \eta P_m\frac{V_{dis}}{V} \times \frac{RPM}{30} & (6) \end{cases}$$

wherein:

η is the volumetric efficiency of the internal combustion engine 106;

MAF is the mass airflow measured and monitored by MAF sensor 120;

$P_m$ is the intake manifold pressure measured and monitored by the MAP sensor 122;

R is the ideal gas constant;

T is the intake manifold temperature measured and monitored by the MAT sensor 124.

V is the intake manifold volume, which is a known value and is stored in the memory 118;

$f_i$ is intake manifold burned gas fraction;

m is the cylinder charge AC;

$f_{exh}$ is the exhaust manifold burned gas fraction;

$V_{dis}$ is engine displacement, which is a known value and is stored in the memory 118;

RPM is engine speed; and $W_{EGR}$ is the exhaust gas recirculation flow.

In view of Equation (4), step 218 entails determining, via the control module 114, the volumetric efficiency of the internal combustion engine 106 in real time based, at least in part, on the oxygen percentage (e.g., oxygen volume percentage or oxygen mass percentage) of the gases in the intake manifold 104 and measured by the oxygen sensor 126. Specifically, step 218 entails determining, via the control module 114, the volumetric efficiency $\eta$ of the internal combustion engine 106 in real time based, at least in part, on the exhaust manifold burned gas fraction $f_{exh}$ the intake manifold burned gas fraction $f_i$, and the mass of the cylinder charge AC in the intake manifold.

While the best modes for carrying out the teachings have been described in detail, those familiar with the art to which this disclosure relates will recognize various alternative designs and embodiments for practicing the teachings within the scope of the appended claims.

The invention claimed is:

1. A method for estimating a volumetric efficiency in an internal combustion engine in real time, the internal combustion engine being part of a powertrain, the powertrain including an intake manifold in fluid communication with the internal combustion engine, the method comprising:

monitoring an oxygen percentage of gases in the intake manifold using an oxygen sensor coupled to the intake manifold; and determining, via a control module, the volumetric efficiency of the internal combustion engine in real time based, at least in part, on the monitored oxygen percentage of gases in the intake manifold.

2. The method of claim 1, further comprising monitoring an intake manifold pressure using a manifold absolute pressure (MAP) sensor.

3. The method of claim 2, further comprising monitoring a mass airflow in the intake manifold using a manifold airflow (MAF) sensor coupled to the intake manifold.

4. The method of claim 3, further comprising monitoring an intake manifold temperature using a manifold air temperature (MAT) sensor coupled to the intake manifold.

5. The method of claim 4, wherein the powertrain further includes an exhaust manifold in selective fluid communication with the intake manifold, and the method further includes monitoring an air/fuel ratio in an exhaust gas exiting the exhaust manifold using an air/fuel ratio sensor.

6. The method of claim 5, further comprising determining, via a control module, an exhaust manifold burned gas fraction based, at least in part, on the air/fuel ratio in the exhaust gas exiting the exhaust manifold.

7. The method of claim 6, further comprising determining, via the control module, an intake manifold burned gas fraction based, at least in part, on the oxygen percentage of the gases in the intake manifold.

8. The method of claim 7, further comprising determining, via the control module, a mass of a cylinder charge based, at least in part, on the intake manifold temperature and the intake manifold pressure.

9. The method of claim 8, wherein determining, via the control module, the volumetric efficiency in real time includes determining, via the control module, the volumetric efficiency of the internal combustion engine in real time based, at least in part, on the exhaust manifold burned gas fraction, the intake manifold burned gas fraction, and the mass of the cylinder charge in the intake manifold.

10. A powertrain, comprising:

an intake manifold;

an oxygen sensor operatively coupled to the intake manifold such that the oxygen sensor is capable of monitoring an oxygen percentage of gases inside the intake manifold;

an internal combustion engine in fluid communication with the intake manifold;

an exhaust manifold in fluid communication with the internal combustion engine, wherein the exhaust manifold is in selective fluid communication with the intake manifold; and a control module in communication with the oxygen sensor, wherein the control module is programmed to determine a volumetric efficiency of the internal combustion engine in real time based, at least in part, on the monitored oxygen percentage of gases in the intake manifold.

11. The powertrain of claim 10, further comprising a manifold absolute pressure (MAP) sensor operatively coupled to the intake manifold such that the MAP sensor is capable of monitoring an intake manifold pressure.

12. The powertrain of claim 11, further comprising a manifold airflow (MAF) sensor operatively coupled to the intake manifold such that the MAF sensor is capable of monitoring mass airflow in the intake manifold.

13. The powertrain of claim 12, further comprising a manifold air temperature (MAT) sensor operatively coupled to the intake manifold such that the MAT sensor is capable of monitoring an intake manifold temperature.

14. The powertrain of claim 13, further comprising an exhaust manifold in selective fluid communication with the intake manifold, and an air/fuel ratio sensor operatively coupled to the exhaust manifold such that the air/fuel ratio sensor is capable of monitoring an air/fuel ratio in exhaust gases exiting the exhaust manifold.

15. The powertrain of claim 14, wherein the control module is programmed to determine an exhaust manifold burned gas fraction based, at least in part, on the air/fuel ratio in the exhaust gas exiting the exhaust manifold.

16. The powertrain of claim 15, wherein the control module is configured to determine an intake manifold burned gas fraction based, at least in part, on the oxygen percentage of the gases in the intake manifold.

17. The powertrain of claim 16, wherein the control module is programmed to determine a mass of a cylinder charge based, at least in part, on the intake manifold temperature and the intake manifold pressure.

18. The powertrain of claim 17, wherein the control module is programmed to determine the volumetric efficiency based, at least in part, on the exhaust manifold burned gas fraction, the intake manifold burned gas fraction, and the mass of the cylinder charge in the intake manifold.

* * * * *